US007028079B2

(12) United States Patent
Mastrianni et al.

(10) Patent No.: US 7,028,079 B2
(45) Date of Patent: Apr. 11, 2006

(54) METHOD AND APPARATUS FOR THE AUTOMATIC MIGRATION OF APPLICATIONS AND THEIR ASSOCIATED DATA AND CONFIGURATION FILES

(75) Inventors: Steve J. Mastrianni, Unionville, CT (US); Thomas E. Chefalas, Somers, NY (US)

(73) Assignee: Lenovo (Singapore) Pte, Ltd., Singapore (SG)

( * ) Notice: Subject to any disclaimer, the term of this patent is extended or adjusted under 35 U.S.C. 154(b) by 617 days.

(21) Appl. No.: 09/865,249

(22) Filed: May 25, 2001

(65) Prior Publication Data

US 2002/0178233 A1 Nov. 28, 2002

(51) Int. Cl.
G06F 15/16 (2006.01)

(52) U.S. Cl. .................. 709/217; 709/232; 707/204; 711/161; 711/162

(58) Field of Classification Search ............. 707/704; 709/232; 711/161, 162
See application file for complete search history.

(56) References Cited

U.S. PATENT DOCUMENTS

| 5,093,779 | A | * | 3/1992 | Sakurai ................... 707/1 |
| 5,412,808 | A | | 5/1995 | Bauer ...................... 395/600 |
| 5,423,022 | A | | 6/1995 | Ackley ..................... 395/500 |
| 5,504,852 | A | | 4/1996 | Thompson-Rohrlich .... 395/159 |
| 5,617,568 | A | | 4/1997 | Ault et al. ................ 395/612 |
| 5,649,205 | A | | 7/1997 | Martins .................... 395/712 |
| 5,701,451 | A | * | 12/1997 | Rogers et al. ............. 707/1 |
| 5,710,918 | A | * | 1/1998 | Lagarde et al. ........... 707/10 |
| 5,721,908 | A | * | 2/1998 | Lagarde et al. ........... 707/10 |
| 5,729,735 | A | | 3/1998 | Meyering .................. 395/610 |
| 5,745,754 | A | * | 4/1998 | Lagarde et al. ........... 707/104.1 |
| 5,758,153 | A | * | 5/1998 | Atsatt et al. ............. 707/103 R |
| 5,758,352 | A | | 5/1998 | Reynolds et al. .......... 707/200 |
| 5,819,251 | A | | 10/1998 | Kremer et al. ............ 707/1 |
| 5,822,780 | A | * | 10/1998 | Schutzman ................ 711/165 |
| 5,852,747 | A | * | 12/1998 | Bennett et al. ........... 710/40 |
| 5,873,085 | A | | 2/1999 | Enoki et al. ............. 707/10 |
| 5,897,640 | A | | 4/1999 | Veghte et al. ............ 707/202 |
| 5,948,062 | A | | 9/1999 | Tzelnic et al. ........... 709/219 |
| 5,991,772 | A | | 11/1999 | Doherty et al. ........... 707/202 |
| 6,088,694 | A | * | 7/2000 | Burns et al. .............. 707/8 |

(Continued)

FOREIGN PATENT DOCUMENTS

EP 0566964 B1 8/1997

(Continued)

OTHER PUBLICATIONS

EMC Data Manager, EDM Symmetri connect, A description of EDM Symmetrix Connect Backup published on Nov. 1998, pp. 1-9.

(Continued)

*Primary Examiner*—Zarni Maung
*Assistant Examiner*—Backhean Tiv
(74) *Attorney, Agent, or Firm*—Duke W. Yee; Wing Yan Mok

(57) ABSTRACT

A method, apparatus, and computer implemented instructions for the automatic migration of applications and their associated data and configuration files from a source data processing system to a destination data processing system. A data store containing meta data regarding files associated with the application is queried in which the data store includes meta data describing the files accessed by the application. A result is received in response to querying the data store in which the associations are maintained. Copying of the files from the source data processing system to the destination data processing system using the result is initiated.

50 Claims, 5 Drawing Sheets

U.S. PATENT DOCUMENTS

| | | | |
|---|---|---|---|
| 6,145,044 A | 11/2000 | Ogura | 710/126 |
| 6,185,574 B1 | 2/2001 | Howard et al. | 707/200 |
| 6,195,650 B1 | 2/2001 | Gaither et al. | 707/1 |
| 6,230,185 B1* | 5/2001 | Salas et al. | 709/205 |
| 6,233,600 B1* | 5/2001 | Salas et al. | 709/201 |
| 6,266,679 B1 | 7/2001 | Szalwinski et al. | 707/204 |
| 6,279,011 B1 | 8/2001 | Muhlestein | 707/204 |
| 6,314,408 B1* | 11/2001 | Salas et al. | 705/54 |
| 6,321,219 B1 | 11/2001 | Gainer et al. | 707/3 |
| 6,324,581 B1* | 11/2001 | Xu et al. | 709/229 |
| 6,327,703 B1 | 12/2001 | O'Donnell et al. | 717/5 |
| 6,330,570 B1* | 12/2001 | Crighton | 707/204 |
| 6,341,341 B1 | 1/2002 | Grummon et al. | 711/162 |
| 6,351,741 B1 | 2/2002 | Flenniken | 707/2 |
| 6,356,915 B1 | 3/2002 | Chtchetkine et al. | 707/200 |
| 6,381,615 B1 | 4/2002 | Gaither et al. | 707/200 |
| 6,453,325 B1 | 9/2002 | Cabrera et al. | 707/204 |
| 6,453,354 B1 | 9/2002 | Jiang et al. | 709/229 |
| 6,513,051 B1* | 1/2003 | Bolosky et al. | 707/204 |
| 6,639,615 B1 | 10/2003 | Majumdar et al. | 345/839 |
| 6,654,769 B1 | 11/2003 | Ito et al. | 707/200 |
| 6,662,198 B1* | 12/2003 | Satyanarayanan et al. | 707/204 |
| 6,665,689 B1 | 12/2003 | Muhlestein | 707/204 |
| 6,697,846 B1 | 2/2004 | Soltis | 709/217 |
| 6,704,736 B1* | 3/2004 | Rys et al. | 707/100 |
| 6,714,952 B1 | 3/2004 | Dunham et al. | 707/204 |
| 6,732,124 B1* | 5/2004 | Koseki et al. | 707/202 |
| 6,742,035 B1 | 5/2004 | Zayas et al. | 709/226 |
| 6,766,352 B1* | 7/2004 | McBrearty et al. | 709/203 |
| 6,772,177 B1* | 8/2004 | Hsiao et al. | 707/204 |
| 6,789,115 B1* | 9/2004 | Singer et al. | 709/224 |
| 6,804,680 B1 | 10/2004 | Melli | 707/102 |
| 2001/0025311 A1 | 9/2001 | Arai et al. | 709/225 |
| 2002/0103818 A1* | 8/2002 | Amberden | 707/205 |
| 2002/0111840 A1* | 8/2002 | Bagdonas et al. | 705/7 |
| 2002/0120634 A1* | 8/2002 | Min et al. | 707/200 |
| 2002/0169781 A1* | 11/2002 | Poole et al. | 707/100 |
| 2004/0107199 A1 | 6/2004 | Dairymple, III et al. | 707/100 |
| 2004/0193953 A1 | 9/2004 | Callahan et al. | 714/15 |
| 2004/0236916 A1 | 11/2004 | Berkowitz et al. | 711/162 |
| 2005/0021566 A1 | 1/2005 | Mu | 707/200 |

FOREIGN PATENT DOCUMENTS

| | | | |
|---|---|---|---|
| EP | 1455276 A1 | | 9/2004 |
| EP | 1484680 A1 | | 12/2004 |
| WO | WO 99/66401 | * | 12/1999 |
| WO | WO 00/19337 | | 4/2000 |

OTHER PUBLICATIONS

EMC2 White Paper, "Backup Solutions for the Celerra File Server", printed May 15, 2001, pp. 1-8.

Kim et al., "The Design and Implementation of Tripwire: A File System Integrity Checker", Proceedings of the 2nd ACM Conference on Computer and Communications Security, 1994, pp. 1-18.

Christensen et al., "Accessing Remote Filesystems as Autonomous Information Sources", Published Mar. 2000, pp. 1-4.

Lei et al., "An Analytical Approach to File Prefetching", 1997 USENIX Annual Technical Conference, 14 pages.

Mutka et al., "Managing Personal Files Across Independent File Management Units", Distributed Computing Systems, Proceeding Third Workshop on Future Trends, 1992, pp. 254-261.

* cited by examiner

FIG. 5
506 508 510 512 514 516
02062001|170001|mytext.doc|c:\My Documents|word.exe|stevemas| ~ 500
02062001|180722|mytextcopy.doc|c:\My Documents|word.exe|stevemas| ~ 502
02102001|085531|newtext.sav|c:\My Documents|word.exe|stevemas ~ 504
FIG. 6
GetFileList (szAppName, char*criteria);
600
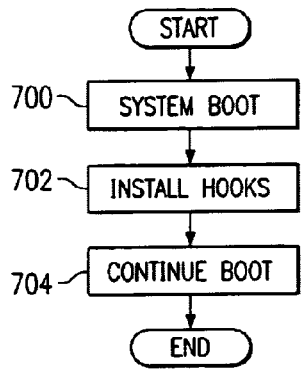
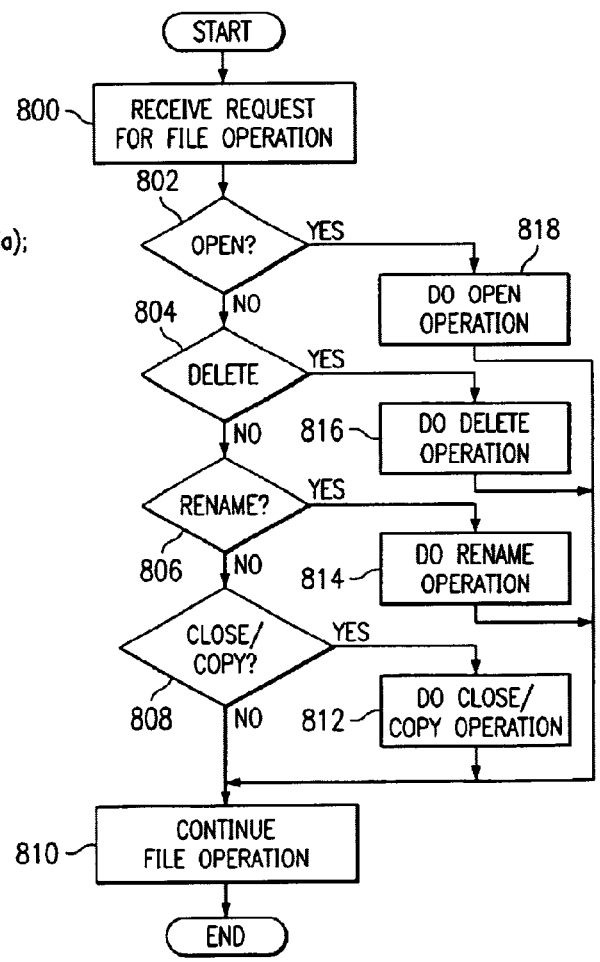

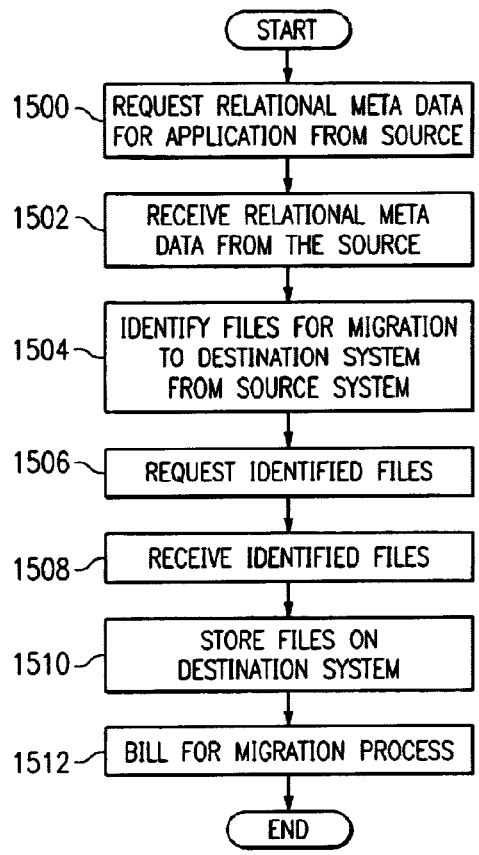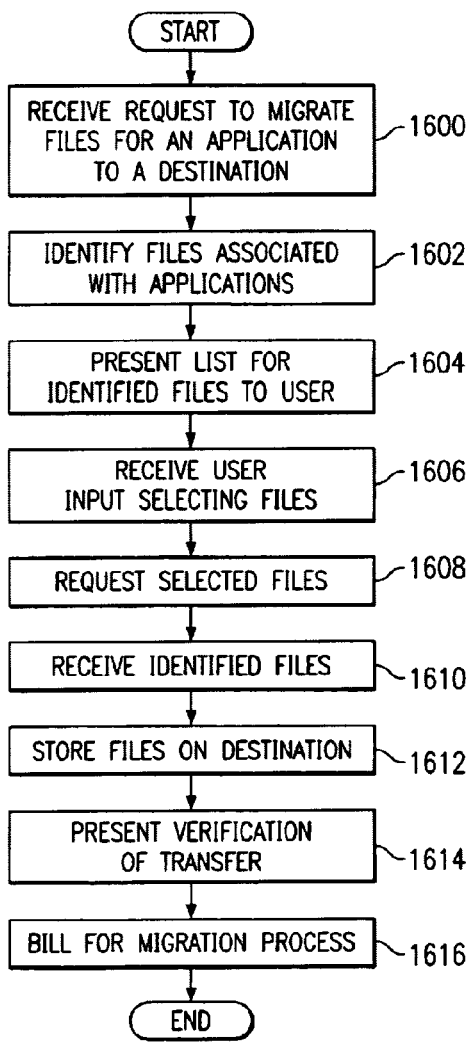

METHOD AND APPARATUS FOR THE AUTOMATIC MIGRATION OF APPLICATIONS AND THEIR ASSOCIATED DATA AND CONFIGURATION FILES

CROSS REFERENCE TO RELATED APPLICATIONS

The present invention is related to Method and Apparatus for the Automatic Discovery of the Relationships Between Applications and Their Associated Data and Configuration Files, Ser. No. 09/865,243, and Method and Apparatus for Performing the Identification of Files to be Backed Up Using Relational Meta Data, Ser. No. 09/866,251 filed even date hereof, assigned to the same assignee, and incorporated herein by reference.

BACKGROUND OF THE INVENTION

1. Technical Field

The present invention relates generally to an improved data processing system, and in particular to a method and apparatus for managing information about applications and files. Still more particularly, the present invention provides a method, apparatus, and computer implemented instructions for the automatic migration of applications and the files associated with the applications.

2. Description of Related Art

When an application is installed on a computer system, the setup program, which is part of the application and supplied by the application supplier, registers with the operating system that the application will be creating data files of a certain file type on the file system. More specifically, the setup program tells the operating system the type of data files that will be created, edited, deleted, or otherwise manipulated by the application. Data files manipulated by the application are associated with that application as long as that application remains installed on the computer system, providing the file type is not changed. If the application is removed, the mapping of the file extension to the application is lost. The current state of the art is to identify the data file type with a one to three-letter filename extension. For example, the setup program for Microsoft Word registers with the operating system to indicate that filenames with the extension ".doc" are associated with Microsoft Word. Microsoft Word is a word processing program available from Microsoft Corporation. As a result, when a user selects a data file to be opened, the operating system uses the filename extension of that data file to determine which application should be launched.

Users typically install dozens of applications on a data processing system, such as editors, e-mail programs, Internet browsers, and business applications such as payroll or inventory access. Each of these applications usually create, edit, rename, or delete data files of a certain data type as determined by the file type extension. These data files may include user identification such as users Ids and passwords, application configuration files, reports, and data files. Currently, each application consistently creates data file types associated with an application vendor determined by the filename extension. For example, Microsoft Word creates document data files using the filename extension ".doc", Lotus WordPro creates document data files using the filename extension ".lwp", and Lotus Notes creates data files using the filename extension ".id" for userid information and ".nsf" for notes databases. Lotus Word Pro and Lotus Notes are available from Lotus Development Corporation. Each application vendor selects a unique filename extension to be used for their application and hopes that no other application vendor selects the same extension. In the case of some programs that use common types of files such as .mid or .jpg, installing another program will often incorrectly associate the data files with the newly installed application.

As the end user executes applications and works on data files, the list of data files associated with the application continually changes. Some data files may be created, others deleted or edited, and some renamed with other filenames or file type extensions. The user also may place some of these files in other places within the file system. With these types of file manipulations, the files may become hard to locate without using a tool to search the hard disk drive for filenames with a well known filename extension for a particular application. The files also may contain extensions that do not follow the recommended file naming convention. For example, the user may create a Microsoft Word document and save it with the filename extension of ".zoo" instead of the standard .doc extension.

If the user's data processing system is replaced for any reason, it becomes nearly impossible to locate all the data files created and required by an application for the purposes of moving those files to the new data processing system. The files may not be in the same place that they were originally created and may not have the same filename or filename extension that is indirectly associated with the application. In addition, the application might create data files, such as application settings, that are not registered with the operating systems associations to applications.

For example, Lotus Notes creates a desktop.dsk file to store the layout of the applications workspace, but the file extension .dsk is not associated with Lotus Notes during the applications installation. If the user attempts to relocate or migrate this application or other applications to another system, all of the files associated with the application should also be moved. Currently, no system or process is present to ensure that all of the data and configuration files can be located and subsequently moved.

The user can search for all occurrences of a particular file extension, but this process is a tedious task. Even if the user finds all files with a particular extension, it is impossible to ensure that all the files of that type have been located because the files may have been renamed or move to another location, such as a network share.

Therefore, it would be advantageous to have an improved method and apparatus for migrating applications and associated data for those applications.

SUMMARY OF THE INVENTION

The present invention provides a method, apparatus, and computer implemented instructions for the automatic migration of applications and their associated data and configuration files from a source data processing system to a destination data processing system. A data store containing meta data regarding files associated with the application is queried in which the data store includes meta data describing the files accessed by the application. A result is received in response to querying the data store in which the associations are maintained. Copying of the files from the source data processing system to the destination data processing system using the result is initiated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram of meta data describing relationships between applications and associated data in accordance with a preferred embodiment of the present invention;

FIG. 6 is a diagram illustrating an example call in accordance with a preferred embodiment of the present invention;

FIG. 7 is a flowchart of a process used for installing the processes for automatically discovering relationships between applications and associated data in accordance with a preferred embodiment of the present invention;

FIG. 8 is a flowchart of a process used for handling requests for file operations in accordance with a preferred embodiment of the present invention;

FIG. 15 is a flowchart of a process used for migrating an application and associated data in accordance with a preferred embodiment of the present invention; and FIG. 16 is a flowchart of a process used for migrating an application and associated data through user input in accordance with a preferred embodiment of the present invention.

DETAILED DESCRIPTION OF THE PREFERRED EMBODIMENT

Figure 1:
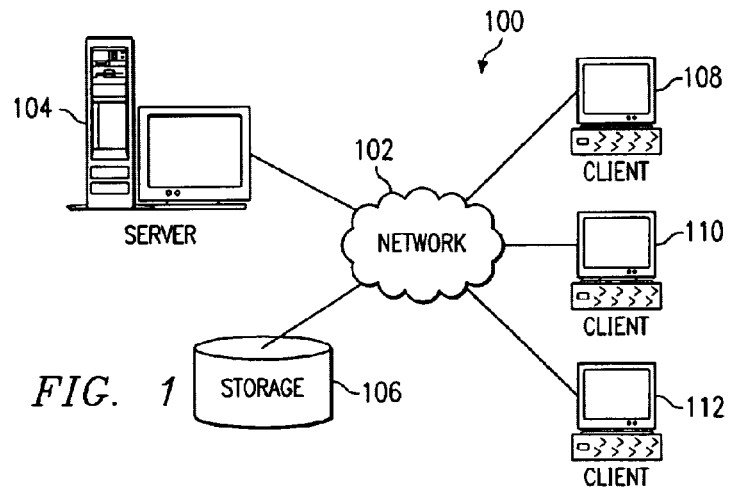
FIG. 1 is a pictorial representation of a network of data processing system in which the present invention may be implemented.

With reference now to the figures, FIG. 1 depicts a pictorial representation of a network of data processing system in which the present invention may be implemented. Network data processing system 100 is a network of computers in which the present invention may be implemented.

Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
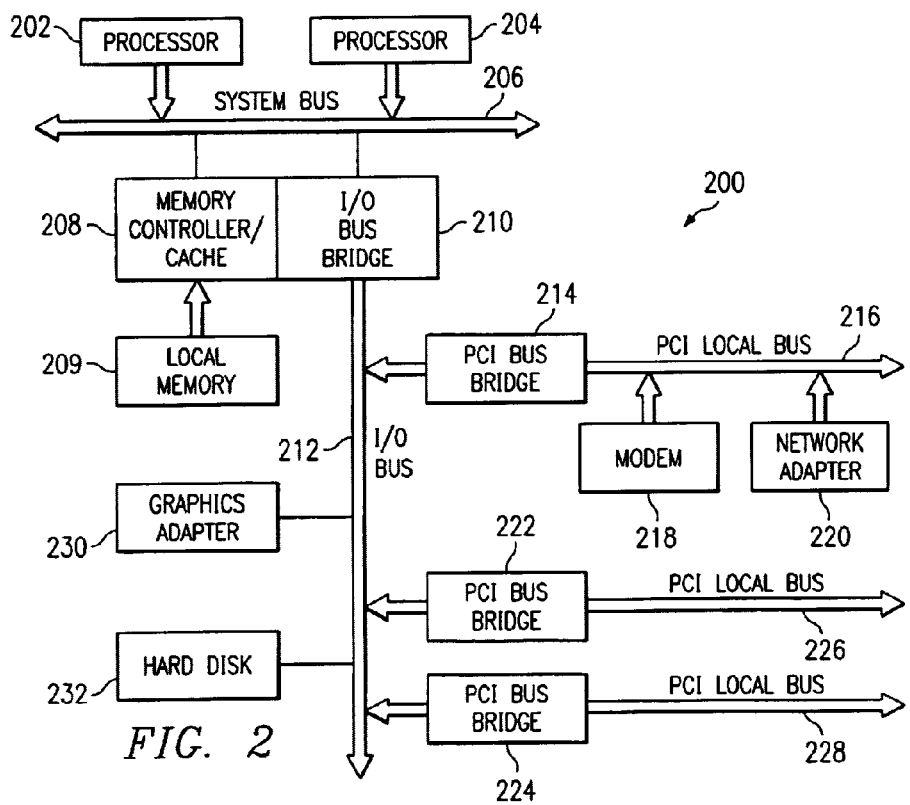
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
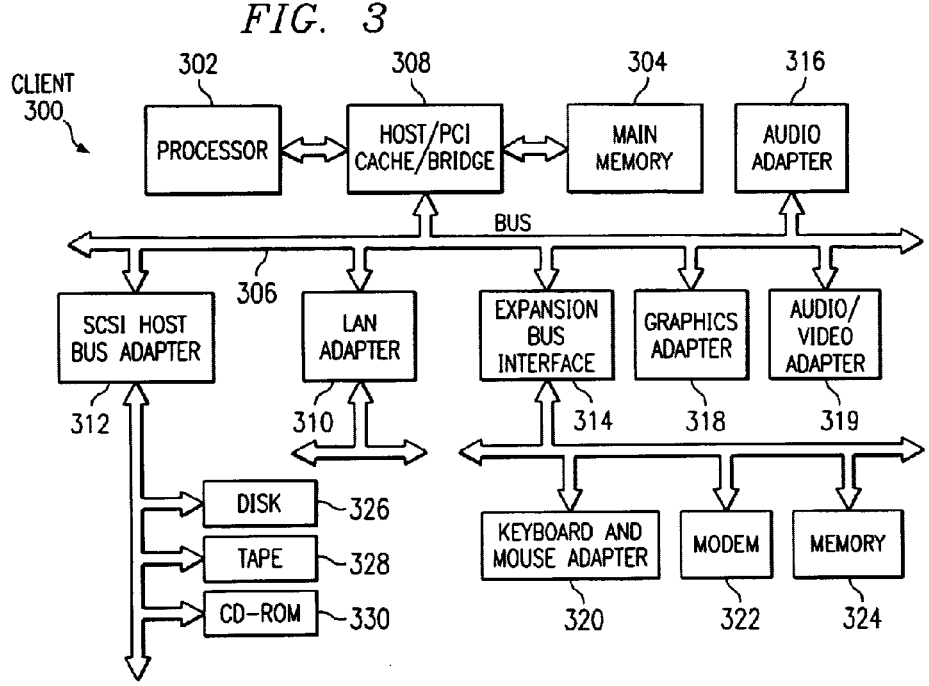
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, maybe used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
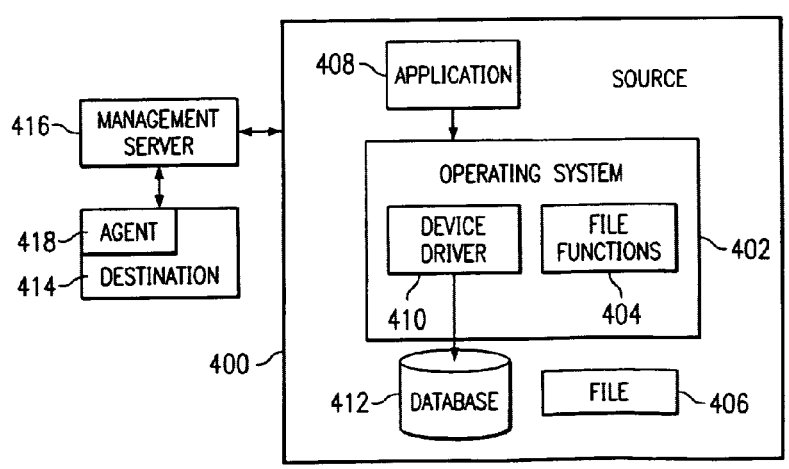
FIG. 4 is a diagram illustrating components involved in migrating applications and associated data in accordance with a preferred embodiment of the present invention.

With reference now to FIG. 4, a diagram illustrating components involved in migrating applications and associated data is depicted in accordance with a preferred embodiment of the present invention. The components illustrated in FIG. 4 may be implemented as software and data structures in data processing systems, such as data processing system 200 in FIG. 2 and data processing system 300 in FIG. 3.

In the depicted examples, source 400 includes operating system 402, which contains file functions 404. These files functions are used to perform different functions on files, such as file 406 in response to requests from applications, such as application 408. These functions include, for example, opening, closing, creating, copying, renaming, and deleting files. When the user starts application 408, application 408 generally requires a data file to act upon. For instance, starting a word processor usually requires that the user indicate the name of the file to be created, edited, or processed. Most applications have some type of open menu where the user specifies which file they are going to work on. The user generally clicks a "file open" button or menu item to open a file, and is then presented with a list of files meeting that criteria to work on.

Using current technology, the list of files available to work on is determined by file type, which may be identified through the file type extension. When an application is installed, it usually notifies the operating system, which file type extension should be associated with that program. For example, Microsoft Word notifies the operating system that it will use files with the .doc extension. After the application is installed, if the user selects a file with the .doc extension, the Microsoft Word application will be launched to operate on that file. Using current technology, the association between the application program and the file type extension exists until that application program is removed from the system. When the application is removed, the removal program also removes any associations that had been established at the time the application was installed.

With the mechanism of the present invention, calls by application 408 to file functions 404 are hooked or routed to device driver 410. Some other service may be used other that device driver 410 depending on the implementation. These functions calls include opening, closing, creating, copying, renaming, and deleting a file. Each time a call for one of the file functions is made, the call is intercepted by device driver 410. The name of the program making the call is identified by device driver 410 along with the name of the data file being operated on.

For example, device driver 410 hooks the single entry point of the "file close" function. Each time a file, such as file 406, is closed, the close is intercepted by device driver 410. Device driver 410 identifies the name of application 408 closing file 406, along with the name of file 406. In this example, file 406 is opened and closed by application 408, representing a normal close of file 406. The relational meta data that represents the association of file 406 to application 408 is updated in database 412 with the new information. If application 408 opens file 406, but another software entity, such as operating system 402 closes file 406, then an abnormal close may have occurred because of a failure in application 408.

Each time a file is opened or closed, the relational meta data for the given file is updated by device driver 410. The mechanism of the present invention also may hook the operating system entry points for file erase, file rename, file move, and file copy functions. These additional hooks also update the relational meta data in database 412. If an application program, in the process of executing, creates a file, the file creation information and association to the application program is stored in relational meta data. If the application program deletes a file, the relational meta data for the deleted file is deleted. The relational meta data for file 406 is updated in database 412 is updated if the application renames file 406. It is important to note that, in these examples, in the event that the same file is accessed by more than one program, the database will contain the reference to the application that accessed the file most recently.

If the user copies file 406 to another location, the relational meta data for file 406 is updated with the new location. If multiple applications perform activity against file 406, the relational meta data for file 406 is updated to reflect the association to multiple applications.

When application 408 is started, the user is presented with a list of files to work on, depending on the file type extension registered with the operating system by application 408. The user selects one or more files to work on, and then confirms the choice by clicking an OK button or similar type of control. Some application programs, such as Microsoft Word, keep a finite length list of the files acted upon in persistent storage. One of the options the user has is to select the history list of files that have been accessed by the application program. The mechanism of the present invention provides for a method, apparatus, and computer implemented instructions for a convenient way to provide quick access to frequently manipulated files.

The list of files displayed that can be acted upon is based on the file type extension. However, the user may have renamed the file with a different extension, or moved the file to another area on the disk or even another computer or network share. Application 408 has no direct knowledge of these files, their new extension, or their new location because the file type extension has changed or the files have been moved to an unknown location. Because this information is in database 412, application 408 can query database 412 through calls to device driver 410 to find the file names and location of all of the data and configuration files associated with the application 408. Application 408 then uses the list of files from database 412 to present to the user at the time application 408 is run. Instead of choosing a data file of a certain file type extension and from a specified physical location on the disk, the user can now select any file that had been created by application 408 and from any location on the disk. The access to database 412 may be provided through standard application programming interface (API) calls made to device driver 410 from application 408 or another application. Using the access methods provided by the invention the user can query the relational database with such queries as:

Show me the files created between Dec. 1, 2000 and Dec. 15, 2000.

Show me the files created since Jan. 1, 2001 by the user stevemas.

Show me all of the files associated to the Lotus 1-2-3 program.

The association of applications with files and file locations may extend to files created, stored, or moved to remote storage devices located on another computer system. The mechanism of the present invention may be installed as an integral part of operating system 402, such as within a kernel. Alternatively, the mechanism may be added as a patch or add-on component if added to operating system 402 after its installation.

In these examples, the meta data is stored in a data store that takes the form of a database. A data store is some data structure or system used to store meta data. Another data store, which may be used, is a flat file or a table.

When a user or administrator desires to migrate an application from source 400 to another data processing system, such as destination 414, the user invokes the mechanism of the present invention. The user may select a "migrate" function on management server 416. This option presents a menu of the files to migrate by reading the relational meta data for each file that is related to the relevant applications. The user can then accept or refuse for one or more files to be copied or migrated to the new system. Alternatively, management server 416 may be employed to identify files without requiring a user to select files for migration.

When it becomes necessary to migrate the user's data due to machine failure, machine replacement, hardware failure, or any other circumstance, the user invokes the mechanism of the present invention by using the normal program invocation method for that computer system or optionally by booting up the system using a set of special floppy disks that contain the processes of the present invention. The latter method of invocation is particularly useful if the system from which to migrate the data has become inspirational or unbeatable using normal methods.

The mechanism of the present invention queries the relational meta data in database 412 and builds a list of the files to transfer from source 400 to destination 414. Management server 416 acts as an agent or intermediary to ensure that the data is transferred successfully and completely, and that the data is copied and stored in the correct folder or directory on destination 414. Files may be transferred from source 400 to management server 416 for temporary storage. When destination 414 is ready to accept files or has been identified, then the files may be sent from management server 416 to destination 414. Alternatively, the files may be transferred directly from source 400 to destination 414 with management server 416 monitoring and verifying the transfer of data.

The mechanism of the present invention determines the correct location on destination 414 by examining the system configuration to determine the correct location of the data files. Alternatively, destination 414 may act as the intermediary or agent instead of requiring the management services of management server 416 to facilitate the transfer of files from source 400 to destination 414. In this instance agent 418 ensures that the files are transferred to the appropriate location within destination 414. Additionally, agent 418 resolves placement of migrated data in destination 414 even if the location of the application on destination 414 is different from that in source 400.

The invention on the source machine then begins the process of copying the necessary data and configuration files to the destination machine until all required files have been successfully copied.

Turning next to FIG. 5, a diagram of meta data describing relationships between applications and associated data is depicted in accordance with a preferred embodiment of the present invention. In the depicted example, records 500, 502, and 504 are examples of meta data, which may be stored in a database, such as database 412 in FIG. 4. Record 500 includes sections 506, 508, 510, 512, 514, and 516.

Section 506 identifies the date of the last file update. Section 508 indicates the time the file was last accessed in hours, minutes, and seconds. Section 510 identifies the name of the file, while section 512 identifies the location of the file. The application making the call for the function is identified in section 514. The user is identified in section 516.

With reference now to FIG. 6, a diagram illustrating an example call is depicted in accordance with a preferred embodiment of the present invention. Call 600 is an example of a call, which may be used to obtain a file list. The call specifies an application name as well as criteria, which may be used to search for records, such as records 500, 502, and 504 in FIG. 5 within database 412 in FIG. 4. The criteria may be, for example, a list of files associated with the Lotus Word Pro application that are more than 30 days old.

Turning next to FIG. 7, a flowchart of a process used for installing the processes for automatically discovering relationships between applications and associated data is depicted in accordance with a preferred embodiment of the present invention. The process begins by detecting a system boot of the data processing system (step 700). Next, hooks are installed (step 702). The hooks installed are those for use by a device driver to hook or intercept calls for file functions. Then, the system boot is continued (step 704) with the process terminating thereafter.

The flowcharts illustrated in FIGS. 8–12 are examples of processes used to automatically discover relationships between applications and associated data. With reference now to FIG. 8, a flowchart of a process used for handling requests for file operations is depicted in accordance with a preferred embodiment of the present invention. The process illustrated in FIG. 8 may be implemented in a device driver, such as device driver 410 in FIG. 4.

The process begins by receiving a request for a file operation (step 800). Next, a determination is made as to whether the file operation is to open a file (step 802). If the file operation is not open, then a determination is made as to whether the file is to be deleted (step 804). If the file is not to be deleted, a determination is made as to whether the file is to be renamed (step 806).

If the file is not to be renamed, a determination is made as to whether the file is closed or copied (step 808). If the file is not to be closed or copied, the file operation continues (step 810) with the process terminating thereafter. At this point, the file operation request is passed to the actual file function that is to process the request.

With reference again to step 808, if the file is to be closed or copied, close or copy operation is performed (step 812) with the process proceeding to step 810. Turning back to step 806, if the file is to be renamed, a rename operation is performed (step 814) with the process proceeding to step 810 thereafter. With reference again to step 804, if the file is to be deleted, a delete operation is performed (step 816) and the process proceeds to step 810 as described above. With reference again to step 802, if the file is opened, an open operation is performed (step 818) with the process proceeding to step 810.

Figure 9:
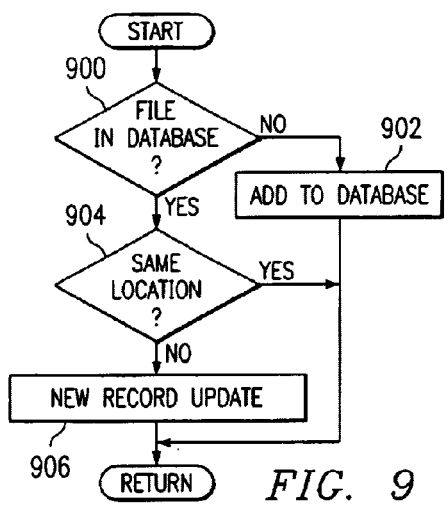
FIG. 9 is a flowchart of a process used for processing an open operation in accordance with a preferred embodiment of the present invention.

Turning next to FIG. 9, a flowchart of a process used for processing an open operation is depicted in accordance with a preferred embodiment of the present invention. The process illustrated in FIG. 9 is a more detailed description of step 818 in FIG. 8.

This process is called in response to an open operation being present. The process begins with a determination as to whether a record of the file identified for the operation is present in the database (step 900). If the file is not present in the database, an identification of the file is added to the database (step 902) with the process returning thereafter for a continuation of the file operation. The identification may include, for example, the name of the file, the name of application requesting the operation, a date, and a time of the request.

Otherwise, a determination is made as to whether the file is found in the same location (step 904). If the file is found at the same location, the process returns to continue process the file operation. If the file is not in the same location, the record is updated with the new location (step 906) with the process then returning. The open operation occurs immediately because the database cannot be updated until it is known that the file can be opened.

Figure 10:
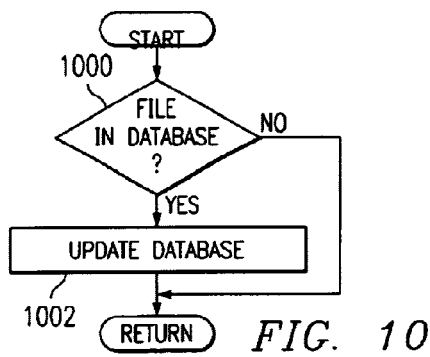
FIG. 10 is a flowchart of a process used for processing a delete operation in accordance with a preferred embodiment of the present invention.

With reference now to FIG. 10, a flowchart of a process used for processing a delete operation is depicted in accordance with a preferred embodiment of the present invention. The process illustrated in FIG. 10 is a more detailed description of step 816 in FIG. 8.

The process begins with a determination as to whether a record of the file is in a database (step 1000). If the file is in the database, the database is updated (step 1002) with the process then returning to continue the file operation. This update reflects the application closing the file as well as other information, such as a time and date of the operation. Otherwise, the process returns without performing any action in the database. In this instance, the file is not tracked by the mechanism of the present invention.

Figure 11:
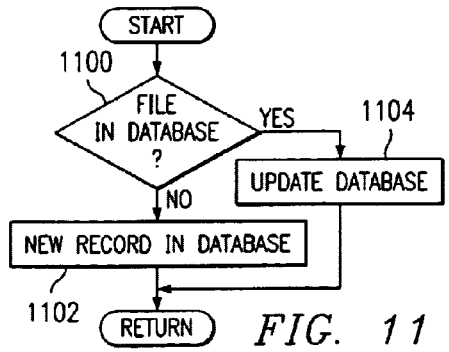
FIG. 11 is a flowchart of a process used for renaming in accordance with a preferred embodiment of the present invention.

Turning next to FIG. 11, a flowchart of a process used for renaming is depicted in accordance with a preferred embodiment of the present invention. The process illustrated in FIG. 11 is a more detailed description of step 814 in FIG. 8.

The process begins with a determination as to whether a record of the file is in the database (step 1100). If the file is not in the database, a new record is established in the database (step 1102), and the process returns to continue processing the file operation. The new record may be in a format, such as, for example, record 500 in FIG. 5. Otherwise, the database is updated (step 1104) with the process returning for continued processing of the file operation.

Figure 12:
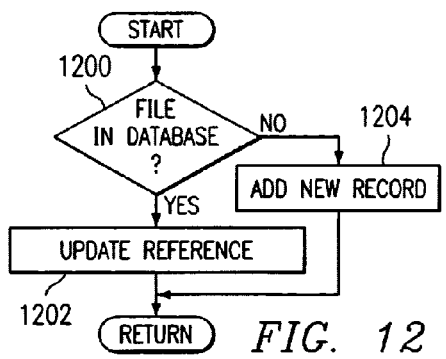
FIG. 12 is a flowchart of a process used for processing a close or copy operation in accordance with a preferred embodiment of the present invention.

With reference now to FIG. 12, a flowchart of a process used for processing a close or copy operation is depicted in accordance with a preferred embodiment of the present invention. The process illustrated in FIG. 12 is a more detailed description of step 812 in FIG. 8.

The process begins with a determination as to whether a record of the file is in a database (step 1200). If the file is in the database, a reference is updated (step 1202) with the process returning to continue the file operation. Otherwise, a new record for the file is added to the database (step 1204), and the process returns for continuation of the file operation.

Figure 13:
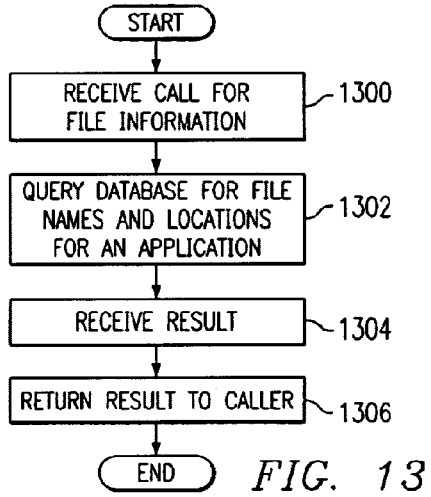
FIG. 13 is a flowchart of a process used for processing queries for file information in accordance with a preferred embodiment of the present invention.

Turning next to FIG. 13, a flowchart of a process used for processing queries for file information is depicted in accordance with a preferred embodiment of the present invention. The process illustrated in FIG. 13 may be implemented in a device driver, such as device driver 410 in FIG. 4.

The process begins by receiving a call for file information (step 1300). This call may be received from an application, such as application 408 in FIG. 4. Next, a database is queried for file names and locations of files for the application identified in the query (step 1302). A result is received from the database (step 1304) and returned to the caller (step 1306) with the process terminating thereafter.

Figure 14:
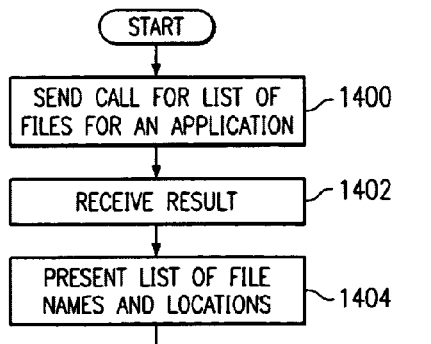
FIG. 14 is a flowchart of a process used by an application to obtain a list of files in accordance with a preferred embodiment of the present invention.

With reference now to FIG. 14, a flowchart of a process used by an application to obtain a list of files is depicted in accordance with a preferred embodiment of the present invention. The process illustrated in FIG. 14 may be implemented in an application, such as application 408 in FIG. 4.

The process begins by sending a call for a list of files for an application (step 1400). This application may be the application generating the call for the list or for another application. This call is sent to a device driver, such as device driver 410 in FIG. 4. Next, a result is received (step 1402). Then, a list of file names and locations is presented on a display to the user (step 1404) with the process terminating thereafter.

One use of the mechanism of the present invention is for migration of applications. When the user needs to migrate the application file data to another system, the user first installs the relevant applications on the new system. The user then invokes the invention and selects the "migrate" option. This option presents a menu of the files to migrate by reading the relational meta data for each file that is related to the relevant applications. The user can then accept or refuse for one or more files to be copied or migrated to the new system.

Turning next to FIG. 15, a flowchart of a process used for migrating an application and associated data is depicted in accordance with a preferred embodiment of the present invention. The process illustrated in FIG. 15 may be implemented in a management sever, such as management server 416 in FIG. 4.

The process begins by requesting relational meta data for an application from a source (step 1500). In this example, the meta data may be requested from a data store, such as database 412 in FIG. 4. This meta data may take a form, such as the records illustrated in FIG. 5. Next, relational meta data is received from the source (step 1502). Files are identified for migration to a destination system from the source (step 1504). Identified files are requested (step 1506), and then received from the source (step 1508). Files are stored on the destination system (step 1510). Billing is performed for the migration process (step 1512) with the process terminating thereafter. In this example, the billing is performed on a per migration basis. Alternatively, the process may be offered as a service that is billed as a monthly fee or on some other periodic basis.

Alternatively, an agent on the destination may include processes illustrated in FIG. 15 for identifying and transferring files from the source to the destination system. In this case, the agent may be requested by a local or remote server to perform the migration on behalf of the user. This migration may be performed at a specified time so that it will not impact normal daily operations. The agent will perform the steps as described in FIG. 15 and then report the status of the migration completion to the requesting local or remote server. This allows the migration service to be directed by a remote management server or provider.

With reference now to FIG. 16, a flowchart of a process used for migrating an application and associated data through user input is depicted in accordance with a preferred embodiment of the present invention. The process illustrated in FIG. 16 may be implemented in a management sever, such as management server 416 in FIG. 4. In this particular example, user input is received to initiate and select files for migration by a user.

The process begins by receiving a request from a user to migrate files for a application to a destination (step 1600). The user input may be received through a graphical user interface (GUI). For example, the user may select a "migrate" button in the GUI. Next, files associated with the application are identified (step 1602). A list of identified files is presented to the user (step 1604). The files may be presented in a number of different ways in GUI. For example, a window containing a list of files may be presented on the GUI. A user may select files from the list that are to be migrated, while other files will be ignored. User input selecting the files is then received (step 1606). Requested files are selected (step 1608), and the identified files are received (1610). Then, the identified files are stored on a destination (step 1612). A verification of the transfer of the identified files is presented to the user (step 1614). The user is billed for the migration of the files (step 1616) with the process terminating thereafter.

In the example illustrated in FIG. 16, a user may initiate the processes in management server 416 in FIG. 4 from a remote data processing system or at the data processing system on which management server 416 is located. For example, the user may actually initiate the process at destination 414 in FIG. 4. The files also may be transferred directly from the source to the destination, rather than being stored temporarily by management server 416. Also, these processes may be implemented in destination 414 without requiring an intermediary, such as management server 416.

Thus, the present invention provides an improved method, apparatus, and computer implemented instructions for migrating applications and associated data to a destination data processing system. The identification of files to be migrated are based on meta data collected during the creating and accessing of files by an application on the source data processing system. This data is collected at an operating system level in the depicted examples. When an application and data are to be migrated to a destination data processing system, the mechanism of the present invention is invoked to retrieve the meta data. This retrieved meta data is used to identify the files and their locations on the source data processing system. Based on these identifications, the files are copied or moved from the source data processing system to the destination data processing system. With the mechanism of the present invention problems associated with changing extensions for files are avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for migrating an application from a source data processing system to a destination data processing system, the method comprising:
responsive to receiving a request to migrate an application from a source data processing system to a destination data processing system, querying a data store at the source data processing system containing meta data regarding files associated with the applications, wherein the meta data describes associations between the files and applications that have accessed the files;
receiving a result in response to querying the data store, wherein the result includes meta data for each file associated with the application;
identifying a list of files associated with the application from the meta data; and
initiating copying of files in the list of files from the source data processing system to a location on the destination data processing system, wherein the location is determined by examining system configuration of the destination data processing system.

2. The method of claim 1 further comprising:
presenting the list of files to a user in a user interface; and
responsive to receiving a user selection of a set of files from the list of files, storing the set of files selected by the user at the destination data processing system.

3. The method of claim 1, wherein the identifying step comprises:
identifying from the meta data a file name and a file location for each file associated with the application; and
building a list of files associated with the application using the file name and file location for each file associated with the application.

4. The method of claim 1, wherein the meta data comprises a last update date of each file, a last access time of each file, a name of each file, a location of each file, an application associated with each file, and a user associated for each file.

5. The method of claim 1, wherein the identifying and initiating steps are performed by an agent at the destination data processing system, and wherein the agent performs the identifying and initiating steps at a specified time when normal daily operations are not impacted.

6. The method of claim 1, wherein the source data processing system records, in the data store, all files accessed by the application while the application was on the source data processing system.

7. The method of claim 1, wherein the-initiating copying step comprises:
copying files in the list of files from the source data processing system to a management server for temporary storage; and
copying the files from the management server to the destination data processing system.

8. A method in a data processing system for migrating an application, the method comprising:
responsive to receiving a request to migrate an application from a source data processing system to a destination data processing system, querying a data store at the source data processing system containing meta data regarding files associated with the application, wherein the data store includes the meta data describing associations between the files and applications that have accessed the files;
receiving a result in response to querying the data store, wherein the result includes meta data for each file associated with the application;
identifying a list of files associated with the application from the meta data;
presenting the list of files to a user in a user interface;
responsive to receiving a user selection of a set of files from the list of files, requesting the set of files selected by the user from the source data processing system; and
responsive to receiving the set of files selected by the user from the source data processing system, storing the set of files selected by the user in a location on the destination data processing system, wherein the location is determined by examining system configuration of the destination data, processing system.

9. The method of claim 8, wherein the identifying step comprises:
identifying front the meta data a file name and a file location for each file associated with the application; and
building a list of files associated with the application using the file name and file location for each file associated with the application.

10. The method of claim 8, storing step comprises:
copying the set of files from the source data processing system to a management server for temporary storage; and
copying the set of files from the management server to the destination data processing system.

11. The method of claim 8, wherein the meta data comprises a last update date of each file, a last access time of each file, a name of each file, a location of each file, an application associated with each file, and a user associated for each file.

12. The method of claim 8, wherein the identifying and initiating steps are performed by an agent at the destination data processing system, and wherein the agent performs the identifying and initiating steps at a specified time when normal daily operations are not impacted.

13. The method of claim 8, further comprising-presenting a verification of transfer of the files to the user.

14. A method for migrating files from a source data processing system to a destination data processing system, the method comprising:
receiving an access request from a program at the source data processing system to access a file, wherein the request is received at an operating system level;
storing an association between the file and the program in a data store;
querying the data store at the source data processing system for files associated with the program;
receiving a result in response to querying the data store, wherein the result includes a list of file names and file locations of files associated with the program; and
initiating copying of the files from a source data processing system on which the files are located to a location on a destination data processing system using the result, wherein the location is determined by examining system configuration of the destination data processing system.

15. The method of claim 14, wherein the association includes a file name for the file and a program name for the program.

16. The method of claim 14, wherein the association further includes at least one of a location of the file, a time of file access, a date of file access, an extension for the file, and an identification of a user of the program.

17. A data processing system comprising:
a bus system;
a communications unit connected to the bus system;
a memory connected to the bus system, wherein the memory includes as set of instructions; and
a processing unit connected to the bus system, wherein to processing unit executes the set of instructions to query a data store at a source data processing system containing meta data regarding files associated with the application, wherein the data store includes meta data that describes associations between the files and the application that has accessed the files, responsive to receiving a request to migrate an application from the source data processing system to a destination data processing system; receive a result in response to querying to data store, wherein the result includes meta data for each file associated with the application; identify a list of files associated with the application from the meta data; and initiate copying of files in the list of files from the source data processing system to a location on the destination data processing system, wherein the location is determined by examining system configuration of the destination data processing system.

18. A data processing system comprising:
a bus system;
a communications unit connected to the bus system;
a memory connected to the bus system, wherein the memory includes as set of instructions; and
a processing unit connected to the bus system, wherein the processing unit executes the set of instructions to query a data store at the source data processing system containing meta data regarding files associated with the application, wherein the meta data describes associations between the files and the application that has accessed the files, responsive to receiving a request to migrate an application from a source data processing system to a destination data processing system; receive a result in response to querying the data store, wherein the result includes meta data for each file associated with the application; identify a list of files associated with the application from the meta data; present the list of files to a user in a user interface; request a set of files selected by the user from the source data processing system responsive to receiving a user selection of the set of files from the list of files and store the set of files selected by the user in a location on the destination data processing system, responsive to receiving the set of files selected by the user from the source data processing system, wherein the location is determined by examining system configuration of the destination data processing system.

19. A data processing system for migrating an application from a source data processing system to a destination data processing system, the data processing system comprising:
responsive to receiving a request to migrate an application from a source data processing system to a destination data processing system, querying means for querying a data store at the source data processing system containing meta data regarding files associated with the application, wherein the meta data describes associations between the files and applications that have accessed the files;
receiving means for receiving a result in response to querying the data store, wherein the result includes meta data for each file associated with the application;
identifying means for identifying a list of files associated with the application from the meta data; and
initiating means for initiating copying of files in the list of files from the source data processing system to a location on the destination data processing system, wherein the location is determined by examining system configuration of the destination data processing system.

20. The data processing system of claim 19, further comprising:
presenting means for a list of files to a user in a user interface; and
responsive to receiving a user selection of a set of files from the list of files, storing means for storing the set of files selected by the user at the destination data processing system.

21. The data processing system of claim 19, wherein the identifying means comprises:
identifying means for identifying from the meta data a file name and a file location for each file associated with the application; and
building means for building a list of files associated with the application using the file name and file location for each file associated with the application.

22. The data processing system of claim 19, wherein the meta data comprises a last update date of each file, a last access time of each file, a name of each file, a location of each file, an application associated with each file, and a user associated for each file.

23. The data processing system of claim 19, wherein identifying and initializing means are performed by an agent at the destination data processing system, and wherein the agent performs the identifying and initializing means at a specified time when normal operations are not impacted.

24. The data processing system of claim 19, wherein the source data processing system records, in the data store, all files accessed by the application while the application was on the source data processing system.

25. The data processing system of claim 19, wherein the initiating copying means comprises:
copying means for copying files in the list of files from the source data processing system to a management server for temporary storage; and
copying means for copying the files from the management server to the destination data processing system.

26. A data processing system for migrating an application, the data processing system comprising:
responsive to receiving a request to migrate an application from a source data processing system to a destination data processing system, querying means for querying a data store at the source data processing system containing meta data regarding files associated with the application, wherein the meta data describes associations between the files and applications that have accessed the files;
receiving means for receiving a result in response to querying the data store, wherein the result includes meta data four each file associated with the application;
identifying means for identifying a list of files associated with the application from the meta data;
presenting means for presenting the list of files to a user in a user interface;
responsive to receiving a user selection of a set of files from the list of files, requesting means for requesting the set of files selected by the user from the source data processing system; and responsive to receiving the set of files selected by the user from the source data processing system, storing means for storing the set of files in a location on the destination data processing system, wherein the location is determined by examining system configuration of the destination data processing system.

27. The data processing system of claim 26, wherein the identifying means comprises:
identifying means for identifying from the meta data a file name and a file location for each file associated with the application; and
building means for building a list of files associated with the application using the file name and file location for each file associated with the application.

28. The data processing system of claim 26, wherein the storing means comprises:
copying means for copying the set of files from the source data processing system to a management server for temporary storage; and
copying mean for copying the set of files from the management server to the destination data processing system.

29. The data processing system of claim 26, wherein the meta data comprises a last update date of each file, a last access time of each file, a name of each file, a location of each file, an application associated with each file, and a user associated for each file.

30. The data processing system of claim 26, wherein the identifying and initiating means are performed by an agent at the destination data processing system, and wherein the agent performs the identifying and initiating means at a specified time when normal daily operations are not impacted.

31. The data processing system of claim 26, further comprising-presenting means for presenting a verification of transfer of the files to the user.

32. A network data processing system for migrating files from a source data processing system to a destination data processing system, the network data processing system comprising:
first receiving means for receiving an access request from a program at the source data processing system to access a file, wherein the request is received at an operating system level;
storing means for storing an association between the file and the program in a data store;
querying means for querying the data store at the source data processing system for files associated with the program;
second receiving means for receiving a result in response to querying the data store, wherein the result includes a list of files names and file locations of files associated with the program; and
initiating means for initiating copying of the files from a source data processing system on which the files are located to a location on a destination data processing system using the result, wherein the location is determined by examining system configuration of the destination data processing system.

33. The network data processing system of claim 32, wherein the association includes a file name for the file and a program name for the program.

34. The network data processing system of claim 32, wherein the association further includes at least one of a location of the file, a time of file access, a date of file access, an extension for the file, and an identification of a user of the program.

35. A computer program product in a computer readable medium for migrating an application from a source data processing system to a destination data processing system, the computer program product comprising:
first instructions for querying a data store at the source data processing system containing meta data regarding files associated with the application responsive to receiving a request to migrate an application from a source data processing system to a destination data processing system, wherein the meta data describes associations between the files and applications that have accessed the files;
second instructions for receiving a result in response to querying the data store, wherein the result includes meta data for each file associated with the application; and
third instructions for identifying a list of files associated with the application from the meta data; and fourth instructions for initiating copying of files in the list of files from the source data processing system to a location on the destination data processing system, wherein the location is determined by examining system configuration of the destination data processing system.

36. The computer program product of claim 35 further comprising:
fifth instructions for presenting the list of files to a user in a user interface;
sixth instructions for storing a set of files selected by the user at the destination data processing system responsive to receiving a user selection of the set of files from the list of files.

37. The computer program product of claim 35, wherein the third instructions comprise:
first sub-instructions for identifying from the meta data a file name and a file location for each file associated with the application; and
second sub-instructions for building a list of files associated with the application using the file name and file location for each file associated with the application.

38. The computer program product of claim 35, wherein the meta data comprises a last update date of each file, a last access time of each file, a name of each file, a location of each file, an application associated with each file, and a user associated for each file.

39. The computer program product of claim 35, wherein the third and fourth instructions are performed by an agent at the destination data processing system, and wherein the agent performs the third and fourth instructions at a specified time when normal daily operations are not impacted.

40. The computer program product of claim 35, wherein the source data processing system records, in the data store, all files accessed by the application while the application was on the source data processing system.

41. The computer program product of claim 35, wherein the fourth instructions comprise:
first sub-instructions for copying the files in the list of flies from the source data processing system to a management server for temporary storage; and
second sub-instructions for copying the files from the management server to the destination data processing system.

42. A computer program product in a computer readable medium for migrating an application, the computer program product comprising:
first instructions for querying a data store at a source data processing system containing meta data regarding files associated with the application responsive to receiving a request to migrate an application from the source data processing system to a destination data processing system, wherein the meta data describes associations between the files and applications that have accessed the files;

second instructions for receiving a result in response to querying the data store, wherein the result includes meta data for each file associated with the application;

third instructions for identifying a list of files associated with the application from the meta data;

fourth instructions for presenting a list of files to a user in a user interface;

fifth instructions for requesting a set of files selected by the user from the source data processing system, responsive to receiving a user selection of the set of files from the list of files; and sixth instructions for storing the set of files in a location on the destination data processing system responsive to receiving the set of files selected by the user from the source data processing system, wherein the location is determined by examining system configuration of the destination data processing system.

43. The computer program product of claim 42, wherein the third instructions comprises:

first sub-instructions for identifying from the meta data a file name and a file location for each file associated with the application; and second sub-instructions for building a list of files associated with the application using the file name and file location for each file associated with the application.

44. The computer program product of claim 42, wherein the sixth instructions comprises:

first sub-instructions for copying the set of files from the source data processing system to a management server for temporary storage; and second sub-instructions for copying the set of files from the management server to the destination data processing system.

45. The computer program product of claim 42, wherein the meta data comprises a last update date of each file, a last access time of each file, a name of each file, a location of each file, an application associated with each file, end a user associated for each file.

46. The computer program product of claim 42, wherein the third instructions are performed by an agent at the destination data processing system, and wherein the agent performs the third instructions at a specified time when normal daily operations are not impacted.

47. The computer program product of claim 42, further comprising:

seventh instructions for presenting a verification of transfer of the files to the user.

48. A computer program product in a computer readable medium for migrating files from a source data processing system to a destination data processing system, the computer program product comprising:

first instructions for receiving an access request from a program at the source data processing system to access a file, wherein the request is received at an operating system level;

second instructions for storing as association between the file and the program in a data store;

third instructions for querying the data store at the source data processing system for files associated with the program;

fourth instructions for receiving a result in response to querying the data store, wherein the result includes a list of file names and file locations of files associated with the program; and fifth instructions for initiating copying of the files from a source data processing system on which the files are located to a location on a destination data processing system using the result wherein the location is determined by examining system configuration of the destination data processing system.

49. The computer program product of claim 48, wherein the association includes a file name for the file and a program name for the program.

50. The computer program product of claim 48, wherein the association further includes at least one of a location of the file, a time of file access, a date of file access, an extension for the file, and an identification of a user of the program.

* * * * *